United States Patent
Abdallah (10) Patent No.: US 10,083,041 B2
(45) Date of Patent: *Sep. 25, 2018

(54) INSTRUCTION SEQUENCE BUFFER TO ENHANCE BRANCH PREDICTION EFFICIENCY

(71) Applicant: Intel Corporation, Santa Clara, CA (US)

(72) Inventor: Mohammad Abdallah, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/860,469

(22) Filed: Jan. 2, 2018

(65) Prior Publication Data

US 2018/0121206 A1    May 3, 2018

Related U.S. Application Data

(63) Continuation of application No. 15/353,623, filed on Nov. 16, 2016, which is a continuation of application
(Continued)

(51) Int. Cl.
  *G06F 9/30* (2018.01)
  *G06F 9/38* (2018.01)

(52) U.S. Cl.
  CPC ........ *G06F 9/3861* (2013.01); *G06F 9/30058* (2013.01); *G06F 9/3808* (2013.01); *G06F 9/3844* (2013.01)

(58) Field of Classification Search
  None
  See application file for complete search history.

(56) References Cited

U.S. PATENT DOCUMENTS 5,881,277 A    3/1999  Bondi et al.
5,903,750 A    5/1999  Yeh et al.
(Continued)

FOREIGN PATENT DOCUMENTS

CN    1305150 A    7/2001
CN    1561480 A    1/2005
(Continued)

OTHER PUBLICATIONS

Communication pursuant to Article 94(3) EPC for European Application No. 11833310, dated Sep. 22, 2014, 5 pages.
(Continued)

*Primary Examiner* — Cheng Yuan Tseng
(74) *Attorney, Agent, or Firm* — NDWE LLP (57) ABSTRACT

A method for outputting alternative instruction sequences. The method includes tracking repetitive hits to determine a set of frequently hit instruction sequences for a microprocessor. A frequently miss-predicted branch instruction is identified, wherein the predicted outcome of the branch instruction is frequently wrong. An alternative instruction sequence for the branch instruction target is stored into a buffer. On a subsequent hit to the branch instruction where the predicted outcome of the branch instruction was wrong, the alternative instruction sequence is output from the buffer.

20 Claims, 8 Drawing Sheets

Related U.S. Application Data

No. 13/879,365, filed as application No. PCT/US2011/055917 on Oct. 12, 2011, now Pat. No. 9,678,755.

(60) Provisional application No. 61/392,391, filed on Oct. 12, 2010.

(56) References Cited

U.S. PATENT DOCUMENTS

| | | |
|---|---|---|
| 6,115,809 A | 9/2000 | Mattson, Jr. et al. |
| 6,157,998 A | 12/2000 | Rupley, II et al. |
| 6,205,545 B1 | 3/2001 | Shah et al. |
| 6,247,097 B1 | 6/2001 | Sinharoy |
| 6,253,316 B1 | 6/2001 | Tran et al. |
| 6,256,727 B1 | 7/2001 | McDonald |
| 6,256,728 B1 | 7/2001 | Witt et al. |
| 6,260,138 B1 | 7/2001 | Harris |
| 6,332,189 B1 | 12/2001 | Baweja et al. |
| 6,457,120 B1 | 9/2002 | Sinharoy |
| 6,594,755 B1 | 7/2003 | Nuechterlein et al. |
| 6,609,189 B1 | 8/2003 | Kuszmaul et al. |
| 7,143,273 B2 | 11/2006 | Miller et al. |
| 7,707,396 B2 | 4/2010 | Bradford et al. |
| 7,783,868 B2 | 8/2010 | Ukai |
| 9,678,755 B2 * | 6/2017 | Abdallah .............. G06F 9/3808 |
| 9,891,923 B2 | 2/2018 | Chen et al. |
| 2001/0049782 A1 | 12/2001 | Hsu et al. |
| 2003/0065887 A1 | 4/2003 | Maiyuran et al. |
| 2004/0034762 A1 | 2/2004 | Kacevas |
| 2004/0093483 A1 | 5/2004 | Nguyen et al. |
| 2004/0143727 A1 | 7/2004 | McDonald |
| 2004/0193857 A1 | 9/2004 | Miller et al. |
| 2004/0225872 A1 | 11/2004 | Bonanno et al. |
| 2004/0230782 A1 | 11/2004 | Busaba et al. |
| 2005/0005085 A1 | 1/2005 | Miyanaga |
| 2006/0004964 A1 | 1/2006 | Conti et al. |
| 2006/0026411 A1 | 2/2006 | Yoshida |
| 2006/0190707 A1 | 8/2006 | McIlvaine et al. |
| 2007/0113059 A1 | 5/2007 | Tran et al. |
| 2008/0120496 A1 | 5/2008 | Bradford et al. |
| 2008/0126771 A1 | 5/2008 | Chen et al. |
| 2008/0195844 A1 | 8/2008 | Shen et al. |
| 2008/0235500 A1 | 9/2008 | Davis et al. |
| 2008/0270774 A1 | 10/2008 | Singh et al. |
| 2009/0158017 A1 | 6/2009 | Mutlu et al. |
| 2009/0287912 A1 | 11/2009 | Sendag |
| 2010/0169611 A1 | 7/2010 | Chou et al. |
| 2012/0005462 A1 | 1/2012 | Hall et al. |
| 2013/0311759 A1 | 11/2013 | Abdallah et al. |
| 2014/0075168 A1 | 3/2014 | Abdallah |
| 2015/0363201 A1 | 12/2015 | Eickemeyer et al. |
| 2016/0092230 A1 | 3/2016 | Chen et al. |
| 2016/0132331 A1 | 5/2016 | Godard et al. |
| 2018/0004528 A1 | 1/2018 | Okazaki et al. |

FOREIGN PATENT DOCUMENTS

| | | |
|---|---|---|
| GB | 2343270 A | 5/2000 |
| TW | 539996 B | 7/2003 |
| TW | 200401187 A | 1/2004 |
| TW | 591530 B | 6/2004 |
| TW | I233545 B | 6/2005 |
| TW | 200707284 | 2/2007 |
| TW | I281121 B | 5/2007 |

OTHER PUBLICATIONS

Communication pursuant to Article 94(3) EPC for European Application No. 11833322.8, dated May 2, 2016, 4 pages.

Extended European Search Report for Application No. EP11833310, dated Jan. 30, 2014, 4 pages.

Extended European Search Report for Application No. EP11833322, dated Feb. 11, 2014, 5 pages.

Final Office Action from U.S. Appl. No. 13/879,374, dated Mar. 11, 2016, 25 pages.

Final Office Action from U.S. Appl. No. 13/879,365, dated Apr. 11, 2016, 12 pages.

Final Office Action from U.S. Appl. No. 13/879,365, dated Dec. 8, 2015, 10 pages.

First Office Action and Search Report from foreign counterpart China Patent Application No. CN201180057525, dated Jan. 7, 2015, 25 pages.

First Office Action from foreign counterpart Chinese Patent Application No. 2011857070, dated Jan. 13, 2016, 18 pages.

Garmany J., "The Power of Indexing: Oracle Tips by Burleson Consulting," Burleson Enterprises, Inc., archived on Mar. 9, 2009, retrieved Sep. 17, 2015 via Internet: web.archive.org/web/20090309201136/http://dba-oracle.com/t_indexing_power.htm, 7 pages.

Intention to Grant a Patent for Application No. EP11833322, dated Mar. 22, 2017, 5 pages.

Intention to Grant a Patent for European Application No. 11833310, dated May 4, 2016, 6 pages.

International Preliminary Report on Patentability for Application No. PCT/US2011/055917, dated Apr. 16, 2013, 5 pages.

International Preliminary Report on Patentability for Application No. PCT/US2011/055943, dated Apr. 25, 2013, 5 pages.

International Search Report and Written Opinion for Application No. PCT/US2011/055917, dated Apr. 27, 2012, 9 pages.

International Search Report and Written Opinion for Application No. PCT/US2011/055943, dated May 22, 2012, 6 pages.

Jacobson, et al., "Path-based Next Trace Prediction," MICRO 30—Proceedings of the 30th Annual IEEE/ACM International Symposium on Microarchitecture, Dec. 1-3, 1997, IEEE Computer Society, Washington, D.C., 1997, pp. 14-23.

Nanda, et al., "The Misprediction Recovery Cache," International Journal of Parallel Programming—Special issue: MICRO-29, 29th annual IEEE/ACM international symposium on microarchitecture, Plenum Press, New York, NY, Aug. 1998, vol. 26 (4), pp. 383-415.

Non-final Office Action from U.S. Appl. No. 13/879,374, dated Jul. 6, 2016, 26 pages.

Non-final Office Action from U.S. Appl. No. 13/879,374, dated Oct. 2, 2015, 44 pages.

Non-Final Office Action from U.S. Appl. No. 13/879,365, dated Sep. 4, 2015, 16 pages.

Non-Final Office Action from U.S. Appl. No. 15/353,623, dated Mar. 9, 2017, 7 pages.

Notice of Allowance from U.S. Appl. No. 13/879,374, dated Dec. 21, 2016, 15 pages.

Notice of Allowance from U.S. Appl. No. 13/879,374, dated Jan. 9, 2017, 9 pages.

Notice of Allowance from U.S. Appl. No. 13/879,365, dated Feb. 10, 2017, 11 pages.

Notice of Allowance from U.S. Appl. No. 13/879,365, dated Jul. 6, 2016, 7 pages.

Notice of Allowance from U.S. Appl. No. 13/879,365 dated Oct. 20, 2016, 8 pages.

Notice of Allowance from U.S. Appl. No. 13/879,374, dated Apr. 5, 2017, 18 pages.

Notice of Allowance from U.S. Appl. No. 15/353,623, dated Jun. 16, 2017, 14 pages.

Notice of Allowance from U.S. Appl. No. 15/353,623, dated Oct. 2, 2017, 10 pages.

Notification to Grant Patent Right for Invention from foreign counterpart China Patent Application No. CN201180057525, dated May 5, 2016, 3 pages.

Patel, et al., "Improving Trace Cache Effectiveness with Branch Promotion and Trace Packing," Proceedings of the 25th annual international symposium on Computer architecture, Jun. 1998, pp. 262-271.

Ramirez, et al., "Fetching instruction streams," Micro 35 Proceedings of the 35th annual ACM/IEEE international symposium on Microarchitecture, Nov. 18, 2002, pp. 371-382.

Rotenberg E., et al., "Trace Cache: a Low Latency Approach to High Bandwidth Instruction Fetching," MICRO 29—Proceedings (56) References Cited

OTHER PUBLICATIONS of the 29th annual ACM/IEEE international symposium on Microarchitecture, IEEE Computer Society, Apr. 11, 1996, 48 pages.
Second Office Action from foreign counterpart China Patent Application No. CN201180057525, dated Sep. 6, 2015, 21 pages.
Second Office Action from foreign counterpart Chinese Patent Application No. 2011857070, dated Jun. 15, 2016, 22 pages.
Third Office Action from foreign counterpart China Patent Application No. CN201180057525, dated Jan. 13, 2016, 7 pages.
Third Office Action from foreign counterpart Chinese Patent Application No. 2011857070, dated Oct. 27, 2016, 7 pages.
Wallace S., et al.,"Multiple Branch and Block Prediction," Third International symposium on High-Performance Computer Architecture, IEEE, Feb. 1997, pp. 94-103.
Ye, et al., "A New Recovery Mechanism in Superscalar Microprocessors by Recovering Critical Misprediction," IEICE Transactions on Fundamentals of Electronics, Communications and Computer Sciences, The Institute of Electronics, Information and Communication Engineers, Dec. 1, 2011, vol. E94-A (12), pp. 2639-2648.
Yeh, et al., "Increasing the Instruction Fetch Rate via Multiple Branch Prediction and a Branch Address Cache," ICS 93, Proceedings of the 7th International Conference on Supercomputing, ACM, New York, NY, Jul. 19-23, 1993, pp. 67-76.
Extended European Search Report for Application No. 17188371.3, dated Mar. 5, 2018, 7 pages.
Non-Final Office Action from U.S. Appl. No. 15/642,113, dated Jan. 24, 2018, 28 pages.
Final Office Action from U.S. Appl. No. 15/642,113, dated Jul. 23, 2018, 21 pages.

\* cited by examiner

| | | |
|---|---|---|
| 1 | Inst A | |
| 2 | Inst B | |
| 3 | Inst C | |
| 4 | Branch.c1 (11, 6) | 101 |
| 5 | Inst D | |
| 6 | Inst E | |
| 7 | Branch.c2 (10, 2) | 102 |
| 8 | Inst F | |
| 9 | Branch.c3 (15, 5) | 103 |
| 10 | Inst G | |
| 11 | Inst H | |
| 12 | Inst I | |
| 13 | Inst J | |
| 15 | Branch.c4 (16, 1) | 104 |
| 15 | Inst K | |
| 16 | Inst L | |

INSTRUCTION SEQUENCE BUFFER TO ENHANCE BRANCH PREDICTION EFFICIENCY

CROSS-REFERENCE TO RELATED APPLICATIONS

This application is a continuation of U.S. patent application Ser. No. 15/353,623, filed Nov. 16, 2016, which application is a continuation of U.S. patent application Ser. No. 13/879,365, filed Aug. 12, 2013 entitled "AN INSTRUCTION SEQUENCE BUFFER TO ENHANCE BRANCH PREDICTION EFFICIENCY," naming Mohammad Abdallah as inventor, which claims foreign priority to Application Number PCT/US2011/055917 filed on Oct. 12, 2011, which is herein incorporated by reference in its entirety, and to provisional patent application 61/392,391 entitled "AN INSTRUCTION SEQUENCE BUFFER TO ENHANCE BRANCH PREDICTION EFFICIENCY," filed on Oct. 12, 2011.

FIELD OF THE INVENTION

The present invention is generally related to digital computer systems, more particularly, to a system and method for selecting instructions comprising an instruction sequence.

BACKGROUND OF THE INVENTION

Improving computer architecture performance is a difficult task. Improvements have been sought through frequency scaling, Single Instruction Multiple Data (SIMD), Very Long Instruction Word (VLIW), multi-threading and multiple processor techniques. These approaches mainly target improvements in the throughput of program execution. Many of the techniques require software to explicitly unveil parallelism. In contrast, frequency scaling improves both throughput and latency without requiring software explicit annotation of parallelism. Recently, frequency scaling hit a power wall so improvements through frequency scaling are difficult. Thus, it is difficult to increase throughput unless massive explicit software parallelization is expressed.

With respect to single threaded program execution, program execution is controlled by branching instructions that dictate the program control flow. Program instruction sequences are dynamic when the branching instructions are conditional or the branch target is indirect. In such cases, it is essential for the fetch logic of the processor to find out for conditional branches if the branch is taken or not taken. This enables the fetch logic to bring in the sequence of instructions that either follow the target of the branch or those that follows the branch instruction itself. There exists a problem, however, in that at the fetch stage, the outcome of the condition of the branch is not known before the branch itself executes.

In an attempt to overcome this problem, prior art designs have implemented branch prediction logic to predict the outcome of a branch. At the fetch stage of the microprocessor, the predicted outcome enables the fetch logic to anticipate where to bring the next sequence of instructions from. Problems still exists, however, since this processing needs to be sequential in nature. The current branch needs to be processed first in order to know where to bring the next instruction sequence. Accordingly the sequential nature of processing branches in the fetch stage imposes a performance bottleneck on the single threaded execution speed of a microprocessor. Penalties for an incorrect branch prediction typically involve flushing the whole pipeline of a microprocessor, accessing caches and reloading with a new instruction sequence. These penalties greatly reduce the incentives for predicting more than one branch at a time.

SUMMARY OF THE INVENTION

Embodiments of the present invention implement an algorithm (e.g., a method and an apparatus) that increases the efficiency of branch production processing of instruction sequences.

In one embodiment, the present invention is implemented as a method for outputting alternative instruction sequences. The method includes tracking repetitive hits to determine a set of frequently hit instruction sequences for a microprocessor. Where in a frequently miss-predicted branch instruction is identified, where in the predicted outcome of the branch instruction is frequently wrong. An alternative instruction sequence for the branch instruction target is stored into a buffer. On a subsequent hit to the branch instruction where the predicted outcome of the branch instruction was wrong, the alternative instruction sequence is output from the buffer.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE INVENTION

Although the present invention has been described in connection with one embodiment, the invention is not intended to be limited to the specific forms set forth herein. On the contrary, it is intended to cover such alternatives, modifications, and equivalents as can be reasonably included within the scope of the invention as defined by the appended claims.

In the following detailed description, numerous specific details such as specific method orders, structures, elements, and connections have been set forth. It is to be understood however that these and other specific details need not be utilized to practice embodiments of the present invention. In other circumstances, well-known structures, elements, or connections have been omitted, or have not been described in particular detail in order to avoid unnecessarily obscuring this description.

References within the specification to "one embodiment" or "an embodiment" are intended to indicate that a particular feature, structure, or characteristic described in connection with the embodiment is included in at least one embodiment of the present invention. The appearance of the phrase "in one embodiment" in various places within the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals of a computer readable storage medium and are capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "writing" or "storing" or "replicating" or the like, refer to the action and processes of a computer system, or similar electronic computing device that manipulates and transforms data represented as physical (electronic) quantities within the computer system's registers and memories and other computer readable media into other data similarly represented as physical quantities within the computer system memories or registers or other such information storage, transmission or display devices.

Figure 1:
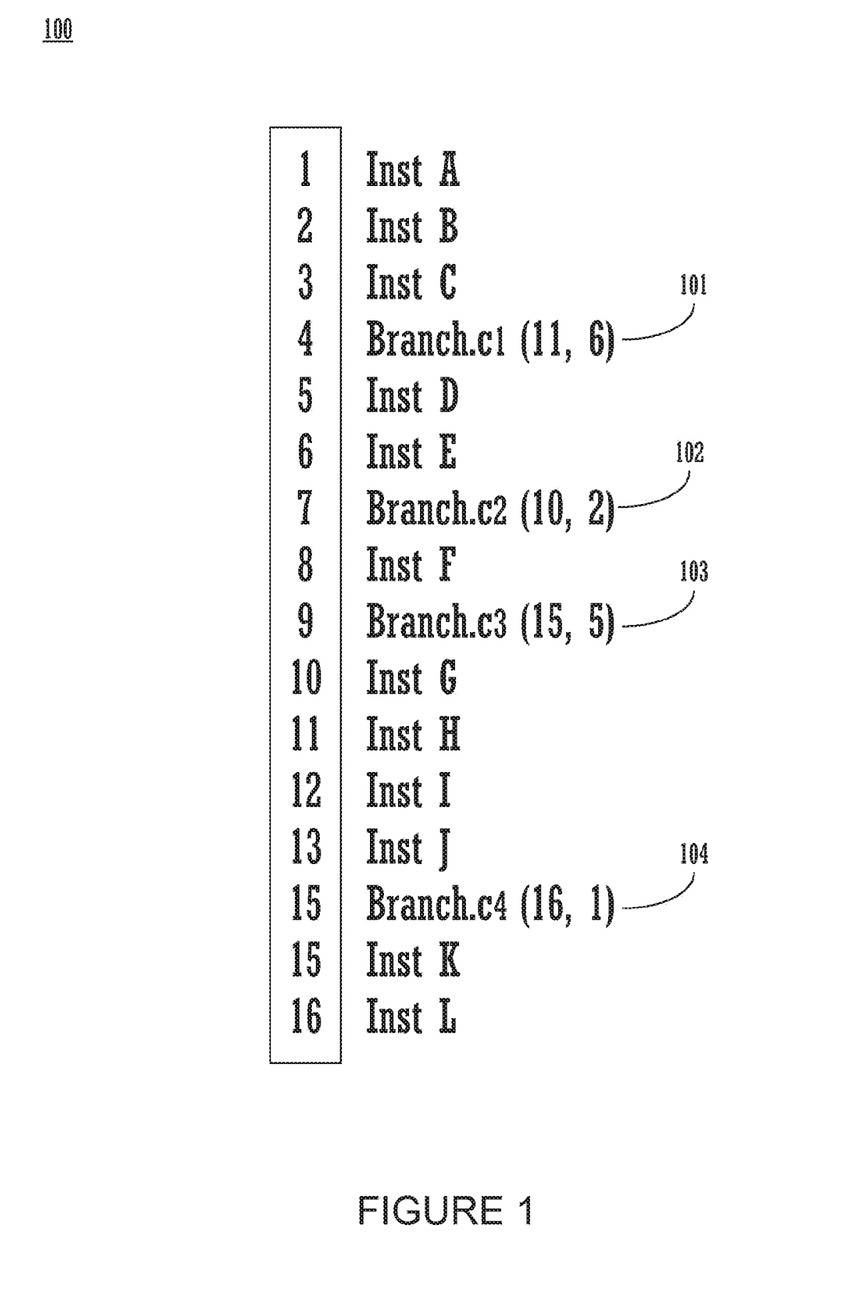
FIG. 1 shows an exemplary sequence of instructions operated on by one embodiment of the present invention.
Figure 2:
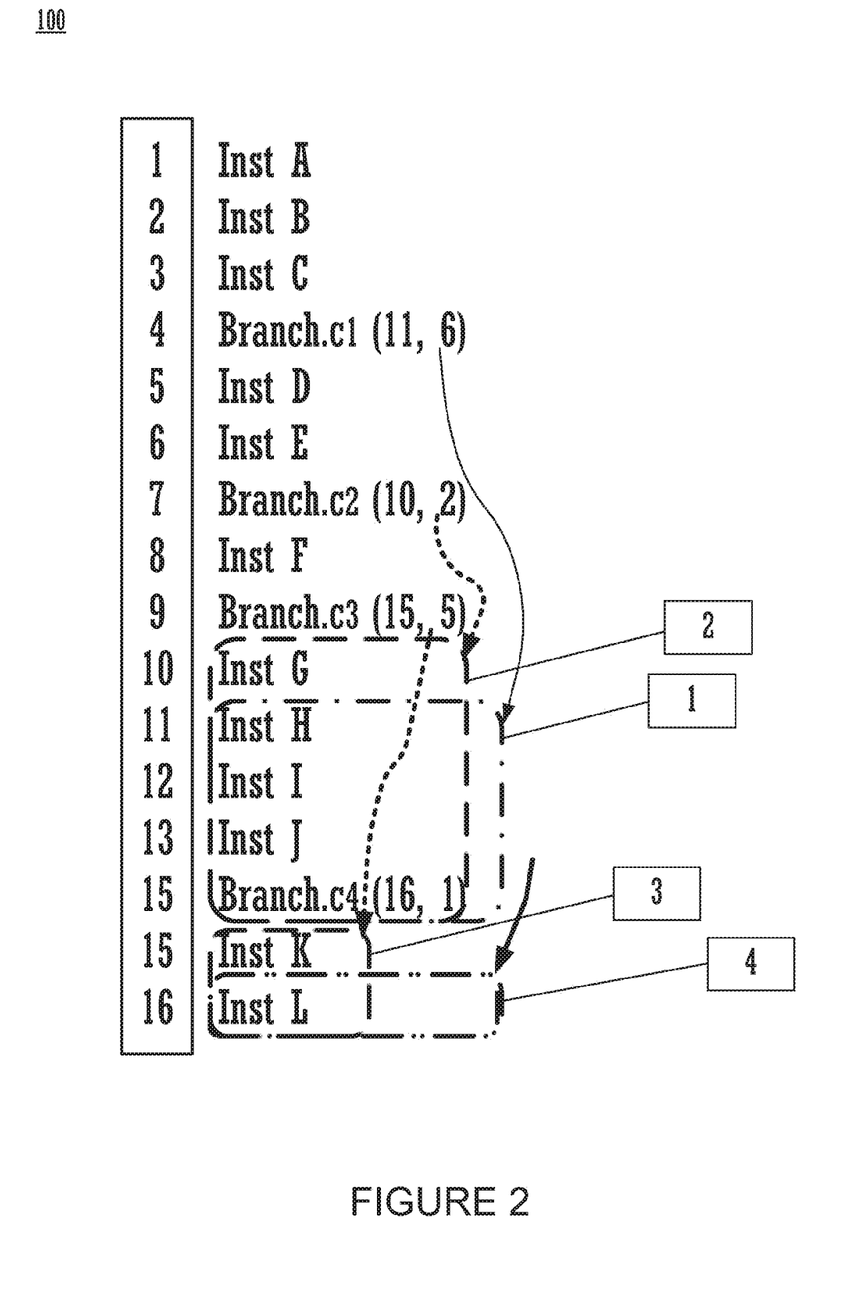
FIG. 2 shows the sequence instructions with the respective code segments for each branch illustrated in accordance with one embodiment of the present invention.
Figure 3:
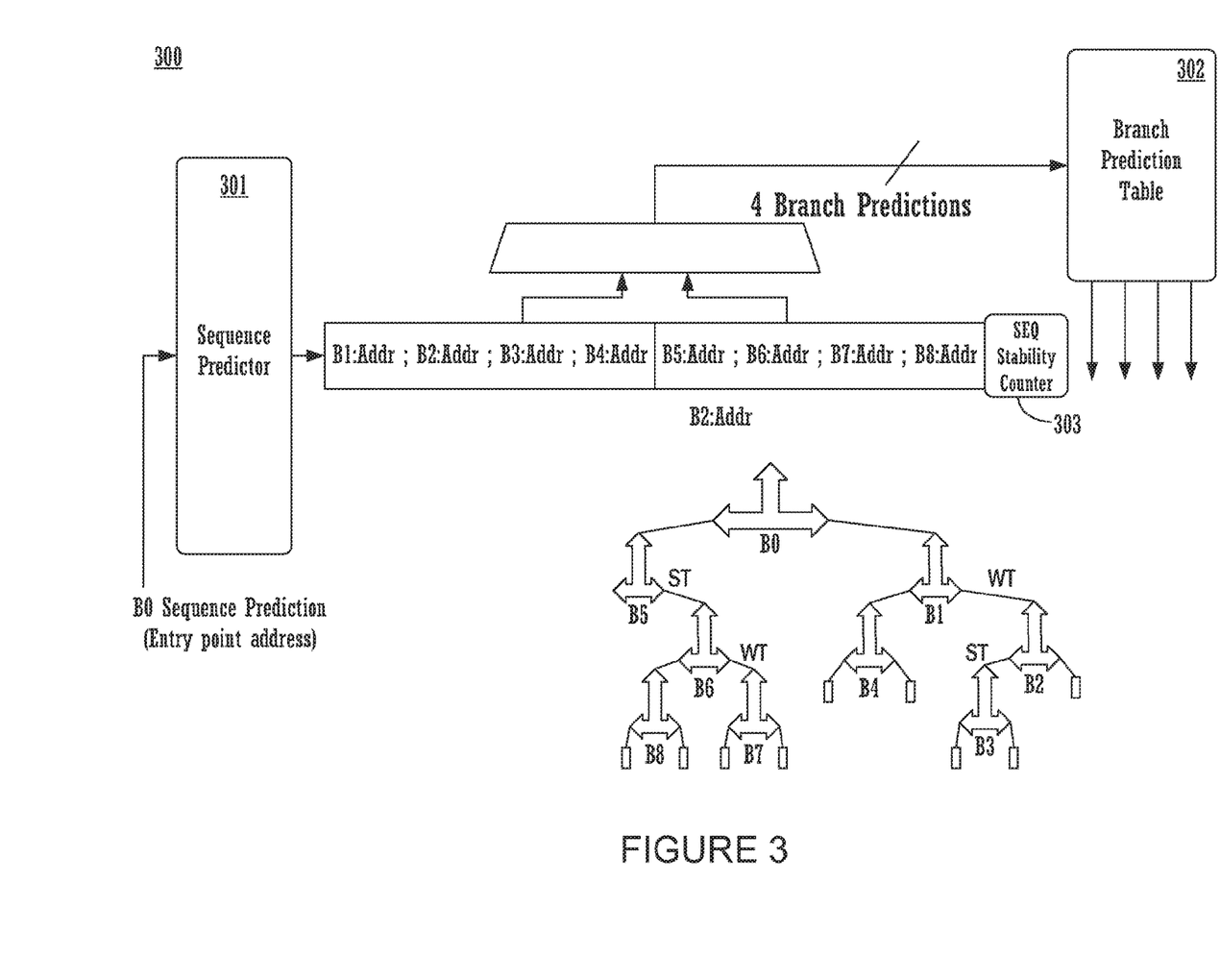
FIG. 3 shows a flow diagram of an apparatus used to output alternative instruction sequences for branches that are frequently hit and are frequently miss-predicted in accordance with one embodiment of the present invention.

In one embodiment, the present invention implements an algorithm (e.g., a method and an apparatus) for outputting alternative instruction sequences for branches that are frequently hit and are frequently miss-predicted. The method includes tracking repetitive hits to a branch instruction to determine a set of frequently hit instruction sequences for a microprocessor. Then frequently miss-predicted branch instructions are identified, wherein the predicted outcome of the branch instruction is frequently wrong. An alternative instruction sequence for the branch instruction is stored into a buffer (e.g., an instruction sequence buffer). On a subsequent hit to the branch instruction where the predicted outcome of the branch instruction was wrong, the alternative instruction sequence is output from the buffer. The alternative instruction sequence thus saves the microprocessor pipeline from being flushed in its entirety. The alternative instruction sequence is provided directly from the buffer, as opposed to, for example, flushing the whole pipeline, accessing caches and assembling a new instruction sequence. FIG. 1 shows an exemplary sequence of instructions operated on by embodiments of the present invention. Subsequently, FIG. 2 shows a flow diagram of alternative instruction sequences produced by multiple levels of branches, and FIG. 3 shows an overview flowchart of the steps of a process for outputting alternative instruction sequences in accordance with one embodiment of the present invention.

In an alternative embodiment, dual use of the storage resources of the instruction sequence buffer is implemented. Instead of storing alternative instruction sequences for frequently hit in frequently miss predicted branches, the storage resources of the instruction sequence buffer are used to store instruction sequences for frequently hit and reliably predicted branches. Thus, instead of storing alternative instruction sequences for the taken case and the not taken case, the storage resources of the buffer 600 are used to store the instruction sequences of a frequently hit and reliably predictable branch and a number of the subsequent following branches. This alternative embodiment is shown and described in FIG. 6 below. The two embodiments can both exist together and share the same storage buffer but in a different manner.

FIG. 1 shows an exemplary sequence of instructions operated on by one embodiment of the present invention. As depicted in FIG. 1, the instruction sequence 100 comprises 16 instructions, proceeding from the top of FIG. 1 to the bottom. As can be seen in FIG. 1, the sequence 100 includes four branch instructions 101-104.

One objective of embodiments of the present invention is to output alternative instruction sequences for branches that are frequently hit and are frequently miss-predicted. The alternative instruction sequences are output as a means of greatly reducing the latency penalty of assembling an alternative instruction sequence from scratch. In accordance with different embodiments, these instructions can comprise native instructions (e.g., native instructions of the microprocessor architecture, such as x86 instructions, MIPS instructions, or the like). Alternatively, these instructions can comprise microcode. As described earlier, the more branches a sequence of instructions include, the more combinations and possible resulting sequences occur and need to be dealt with. This characteristic is illustrated in FIG. 2 below.

FIG. 2 shows the sequence instructions 100 with the respective code segments for each branch illustrated in accordance with one embodiment of the present invention. As described above, the more branches that are presented in a sequence of instructions, the more combinations and possibilities of sequences of instructions that need to be disambiguated.

This is illustrated in FIG. 2, which shows a first resulting sequence "1" that occurs if branch c1 is taken. As referred to herein, a branch is taken if the program execution flow moves to the target of the branch. This is indicated by the two digits within parenthesis at the end of each of the branch instructions. For example, branch c1 has a target of 11 and results in skipping the next 6 instructions. Similarly, branch c2 has a target of 10 and results in skipping the next 2 instructions, and so on.

Thus, a second resulting sequence "2" is shown, and occurs if branch c2 is taken. A third resulting sequence "3" is shown as occurring if branch c3 is taken. Similarly, the fourth resulting sequence "4" is shown as occurring if branch c4 is taken.

Embodiments of the present invention output alternative instruction sequences for branches that are frequently hit and are frequently miss-predicted. As shown in FIG. 2, a different instruction sequence occurs when any of the branches along the predicted instruction sequence is miss-predicted. Embodiments of the present invention advantageously store a number of these alternative instruction sequences in a buffer that is located very close to the decoder hardware. The stored alternative instruction sequences are output as a means of greatly reducing the latency penalty of assembling an alternative instruction sequence from scratch. This algorithm is further diagrammed below in FIG. 3.

FIG. 3 shows a flow diagram of an apparatus 300 used to output alternative instruction sequences for branches that are frequently hit and are frequently miss-predicted in accordance with one embodiment of the present invention. As depicted in FIG. 3, apparatus 300 includes a sequence predictor 301, a branch prediction table 302, and a sequence of stability counter 303.

In the FIG. 3 embodiment, the apparatus 300 functions by tracking repetitive hits to determine a set of frequently hit branches and their corresponding instruction sequences. These branches are illustrated as B0 through B8 in FIG. 3. As described above, a predicted instruction sequence is assembled based upon the branch predictions for the branches. Lines are shown connecting the first branch B0 to the following branches B1 and B5, and from B1 and B5 to their respective following branches B2, B4 and B6, and so on.

The branch prediction table 302 is used to keep track of the branch predictions in order to determine which instruction sequences are often miss predicted and which instruction sequences are very rarely miss predicted.

In the FIG. 3 embodiment, branches are analyzed three levels deep past the initial branch B0. Thus, for example, an alternative instruction sequence can be assembled from B0 to B1, to B2 and on to B3. Depending upon the size of the buffer, a greater or lesser number of levels of following branches can be analyzed and stored.

The sequence predictor 301 functions by predicting the outcome of the branches to assemble a predicted instruction sequences. Accordingly, the sequence predictor can monitor the execution of these branches and identify frequently miss predicted branch instructions. A different number of mechanisms can be used to identify the frequently miss predicted branch instruction. In one embodiment, a tag structure such as a sequence stability counter 303 is used to accumulate repetitive hits to the same instruction sequences (e.g., frequently fetched sequences). Once a threshold as been exceeded, a given branch instruction can be identified as and treated as a frequently miss predicted branch instruction.

Figure 4:
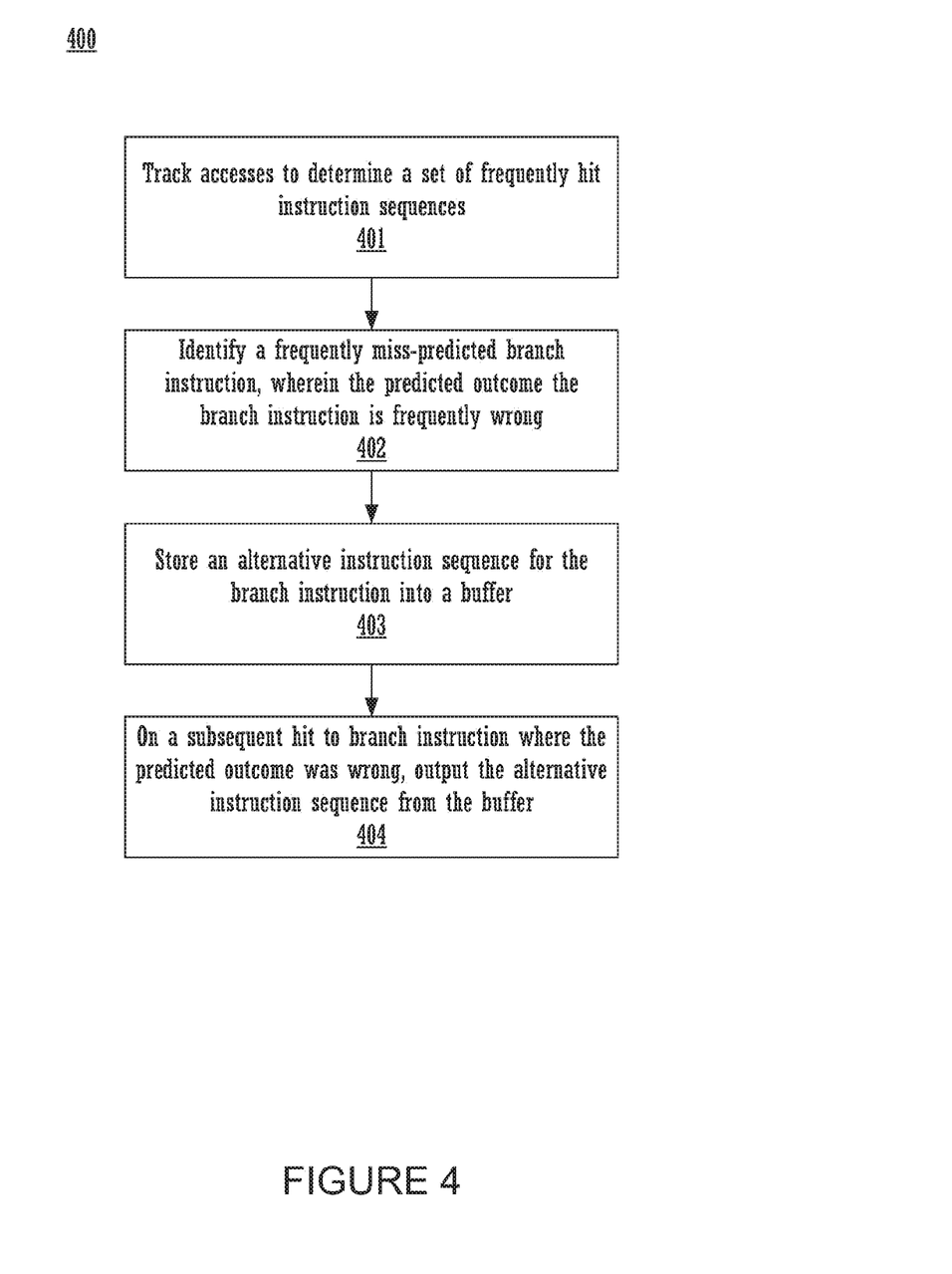
FIG. 4 shows an overview flowchart of the steps of a process for outputting alternative instruction sequences in accordance with one embodiment of the present invention.

FIG. 4 shows an overview flowchart of the steps of a process 400 for outputting alternative instruction sequences in accordance with one embodiment of the present invention. Process 400 shows exemplary operating steps of, for example, an instruction fetch module of a microprocessor.

Process 400 begins in step 401, where accesses are tracked in order to determine a set of frequently hit instruction sequences. As described above, the sequence predictor assembles predicted instruction sequences. It can determine which instruction sequences are frequently fetched.

In step 402, out of that set, the sequence predictor identifies a frequently miss-predicted branch instruction. As described above, the predicted outcome of this branch instruction is frequently wrong.

In step 403, an alternative instruction sequence for the branch instruction is stored into a buffer. As described above, this inability to correctly and reliably predict the outcome of this branch could lead to frequent pipeline flushes. However, in accordance with embodiments of the present invention, alternative instruction sequences are stored within an instruction sequence buffer.

In step 404, on a subsequent hit to the branch instruction where the predicted outcome was wrong, the alternative instruction sequence is output from the buffer. The alternative instruction sequence thus saves the entire microprocessor pipeline from being flushed. The alternative instruction sequence is provided directly from the buffer, as opposed to, for example, flushing the whole pipeline, accessing caches and assembling a new instruction sequence.

It should be noted that in one embodiment, the branch prediction table can be used to prequalify the instruction sequences that enter into the tag structure using a saturating counter in the branch prediction table to count number of repetitive accesses to a certain branch. Once that reaches saturation then the instruction sequence address that starts at the outcome of that branch is entered into the tracking tag structure. This structure has a smaller number of entries and has larger saturating counters. Once the counter reaches a threshold of a large count that justifies storing the instruction sequence, then that instruction sequence is entered into the buffer.

It should be noted that in one embodiment, a different threshold might be used if the sequences that are hit are based on well predicted branches or frequently miss predicted branches. Thereafter, the instruction sequence is accessed from this buffer every time the fetch hardware jumps to this particular instruction sequence and is indexed by the address of the branch that leads to it.

Figure 5:
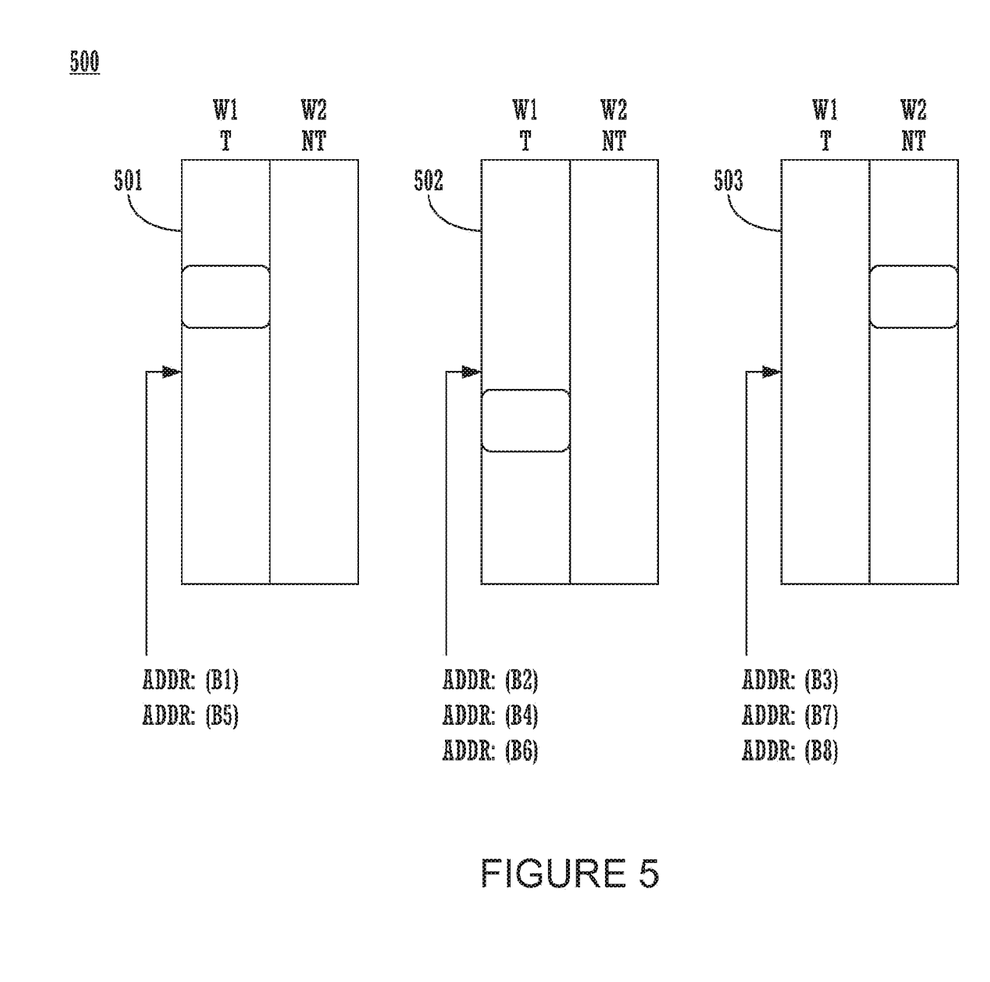
FIG. 5 shows a diagram of an instruction sequence buffer in accordance with one embodiment of the present invention.

FIG. 5 shows a diagram of an instruction sequence buffer 500 in accordance with one embodiment of the present invention. As depicted in FIG. 5, the buffer 500 includes threes portions 501-503. The buffer 500 and the portions 501-503 show an example of embodiments of the present invention storing alternative instruction sequences for each of the possible following branches that flow from branch B0. For each of the branches B1 through B8, the possible resulting instruction sequences from each branch being taken or not taken are stored. For example, instruction sequences for branch B0 being taken (e.g., leading to B1) or not taken (e.g., leading to B5) are stored into the buffer 500. Similarly, instructions for branch B1 being taken (e.g., leading to B2) are not taken (e.g., leading to B4) are stored into the buffer 500, and so on for each of the following branches.

In this manner, the buffer 500 includes all the possible instruction sequences that flow from branch B0. This attribute allows a very quick recovery from a miss prediction of the branch B0. For example, on a subsequent hit to the branch instruction B0, where the predicted outcome of the branch instruction was wrong, an alternative instruction sequence can be rapidly output from the buffer 500. This avoids the necessity of flushing the whole pipeline, accessing caches and assembling a new alternative instruction sequence from scratch (e.g., re-fetching the instructions, etc.).

The FIG. 500 embodiment shows how the portions 501-503 include instruction sequences for both the taken case and the not taken case for each of the branches B0 through B8. For example, portion 501 shows instructions for the taken case stored on a first way of the portion on the left hand side. This is illustrated by the "T" at the top of the portion. Instructions for the not taken case are stored on the right hand side, as illustrated by the "NT" at the top of the portion. The taken and not taken cases represent two ways into which the buffer portion, or cache, can be indexed. This is illustrated as way 1 "W1" and way 2 "W2" at the top of the portion. These attributes are similarly illustrated for each of the other portions 502-503.

The lower portion of FIG. 5 illustrates the manner in which the buffer 500 is indexed. In the FIG. 5 embodiment, to access the alternative instruction sequences for both the taken and not taken cases for each of the following branches, the address of a given following branch is used to index the buffer 500. It should be noted that the alternative instruction sequences are stored within the portions 501-503 in an orthogonal manner. In other words, the alternative instruction sequences that can both possibly be taken from a given branch do not reside within the same portion. For example, as depicted in FIG. 5, the alternative instruction sequences for branch B1 and B5 can reside within the portion 501 because either the instruction sequence for branch B1 or branch B5 will occur. This is because branch B0 will either be taken or not taken. Thus there is no scenario in which instructions from both branch B1 and branch B5 will occur. Similarly, at the next level removed from branch B0, the alternative instruction sequences for branches B2, B4 and B6 can be stored within the portion 502. These alternative instruction sequences are mutually exclusive in that only one of the three can possibly be executed. Similarly, at the next level, portion 503 stores alternative instruction sequences for the branches B3, B7 and B8.

Figure 6:
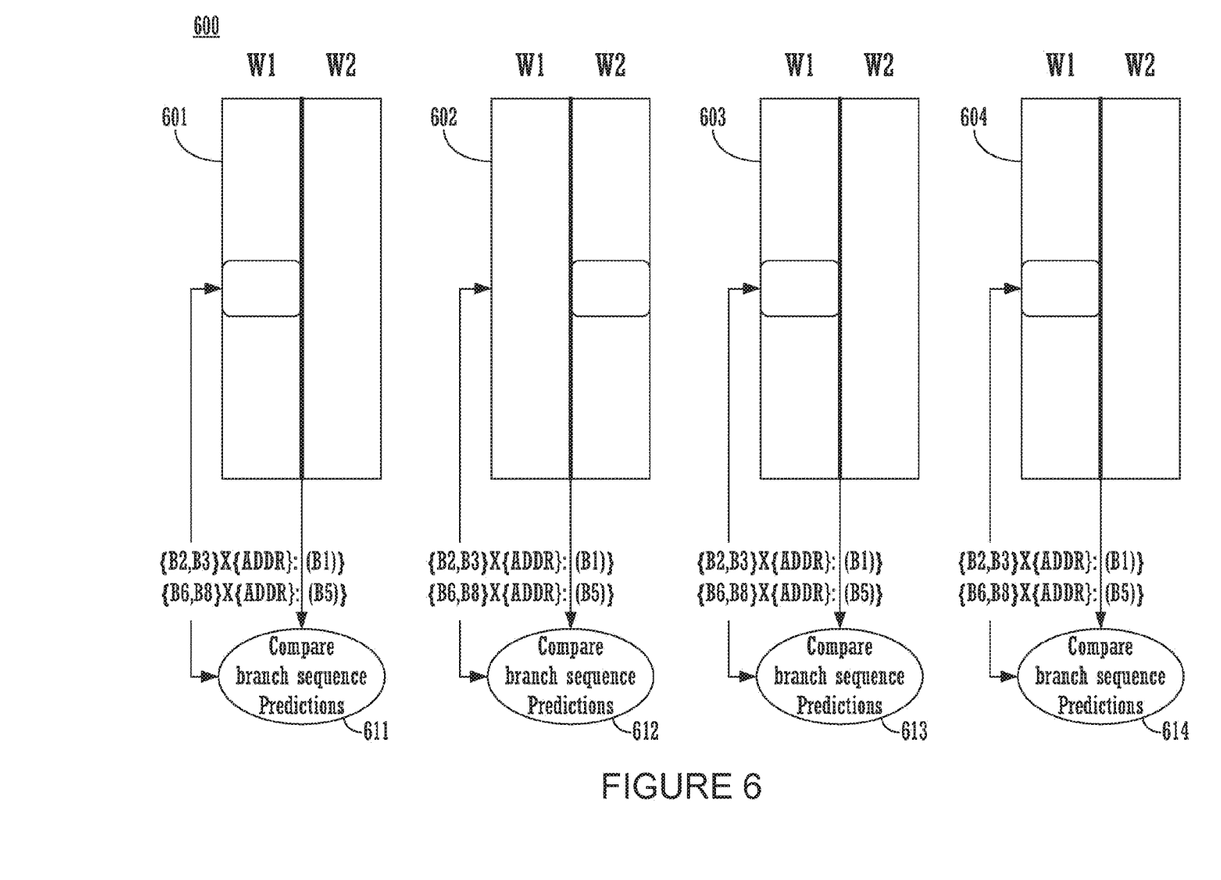
FIG. 6 shows a diagram of an instruction sequence buffer that is used to store instruction sequences for reliably predictable branches that are frequently hit in accordance with one embodiment of the present invention.

FIG. 6 shows a diagram of an instruction sequence buffer 600 that is used to store instruction sequences for reliably predictable branches that are frequently hit in accordance with one embodiment of the present invention. As illustrated in FIG. 6, the buffer 600 comprises four portions 601-604. Each of the portions 601-604 is coupled to respective compare logic components 611-614.

FIG. 6 illustrates an alternative use of the storage resources of the instruction sequence buffer. In the FIG. 6 embodiment, instead of storing alternative instruction sequences for frequently hit in frequently miss predicted branches, the storage resources are used to store instruction sequences for frequently hit and reliably predicted branches. Thus, instead of storing alternative instruction sequences for the taken case and the not taken case, the storage resources of the buffer 600 are used to store the instruction sequences of a frequently hit and reliably predictable branch and a number of the subsequent following branches.

Storing the instruction sequences of a frequently hit and reliably predictable branch and a number of the subsequent following branches provides a number of advantages. On subsequent hits due the reliably predictable branch, the instruction sequence of the predictable branch and a number of the subsequent following branches can be provided directly from the buffer 600. This saves a number of cycles with respect to the latency of assembling the reliably predictable branch instruction sequence from the normal decoder module pipeline. In this manner, embodiments of the present invention take advantage of those reliably predictable instruction sequences to cut out latency cycles by providing such sequences directly from the buffer 600.

It should be noted that the buffer 600 is essentially the same structure as the buffer 500 of FIG. 5. The difference is in the manner in which the buffer 600 is indexed. As described above, the buffer 600 is used to store reliably predictable instruction sequences that flow from multiple branches. The reliably predict the instruction sequences are stored in multiple ways, shown as way 1 "W1" and way 2 "W2" at the top of each of the portions 601-604. In one embodiment, the address of the branches (e.g., branch B1) are used to index into the cache. For example, in a scenario where a reliably predictable instruction sequence flows from B0 to B1 to B2 to B3, the address of the first following branch B1 is used to index the buffer 600 with the following branches B2 and B3 being used as tags. The following branches B2 and B3 would allow for the same index to be accessed via two different ways with two different tags (b2 and b3). In one embodiment, bits of the branch prediction (e.g., provided from the branch which in table 302) can also be used as tags. In one embodiment, a hash of the following branch B1 and its respective following branches B2 and B3 could be used to access the buffer 600.

The compare logic components 611-614 functions by comparing branch sequence predictions. The components 611-614 compare predictions with sequence hits to score the relative merit of the reliably predictable sequences. For example, if a reliably predictable sequence becomes not so strongly predictable for some reason, this component will cause it to be evicted from the buffer 600. In one embodiment, if the reliably predict will sequence becomes a frequently hit in frequently miss predicted sequence, the sequence is moved from the accessing and storing methodology illustrated in FIG. 6 to the accessing and storing methodology illustrated in FIG. 5.

It should be noted that the buffer 600 can be implemented as a unified cache architecture. In such an embodiment, instruction sequences for both the frequently hit in frequently miss predicted instruction sequences and the frequently hit and reliably predictable instruction sequences can both be stored within the common structure of buffer 600. The difference would be the methodology in which they are accessed, indexed and retrieved. In such an embodiment, logic would need to be included to ensure that any instruction sequences that become corrupted due to conflicts or the like are evicted.

Alternatively, in one embodiment, the buffer 600 can be partitioned or otherwise allocated such that storage resources are dedicated to frequently hit frequently miss predicted instruction sequences and dedicated to reliably predictable instruction sequences respectively. Such dedicated allocation would simplify the management of the buffer 600 by making it less likely instruction sequences could corrupt one another.

Figure 7:
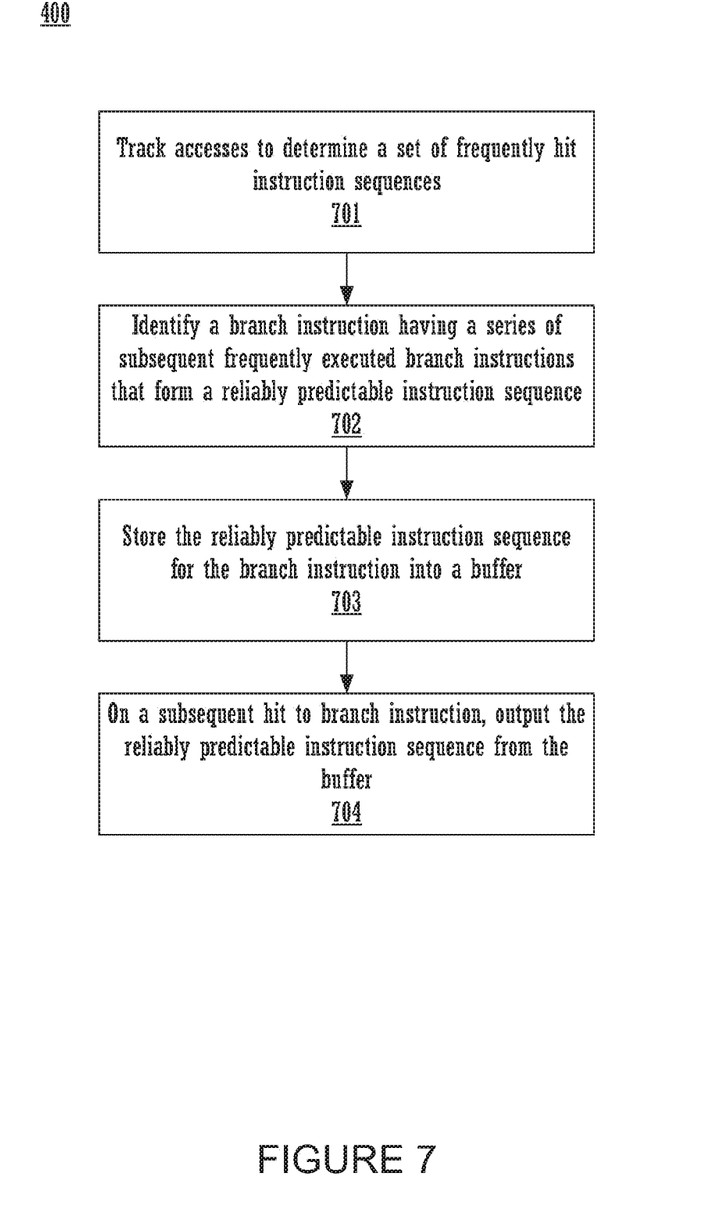
FIG. 7 shows an overview flowchart of the steps of a process for outputting reliably predictable instruction sequences in accordance with one embodiment of the present invention.

FIG. 7 shows an overview flowchart of the steps of a process 700 for outputting reliably predictable instruction sequences in accordance with one embodiment of the present invention. Process 700 shows exemplary operating steps of, for example, an instruction fetch module of a microprocessor.

Process 700 begins in step 701, where accesses are tracked in order to determine a set of frequently hit instruction sequences. As described above, the sequence predictor assembles predicted instruction sequences. It can determine which instruction sequences are frequently fetched.

In step 702, out of that set, the sequence predictor identifies a branch instruction having a series of subsequent following branch instructions that form a reliably predictable instruction sequence.

In step 703, a reliably predictable instruction sequence for the branch instruction is stored into a buffer (e.g., buffer 600).

In step 704, on a subsequent hit to the branch instruction, the reliably predictable instruction sequence is output from the buffer. This saves a number of cycles with respect to the latency of assembling the reliably predictable branch instruction sequence from the normal decoder module pipeline. In this manner, embodiments of the present invention take advantage of those reliably predictable instruction sequences to cut out latency cycles by providing such sequences directly from the buffer 600.

Figure 8:
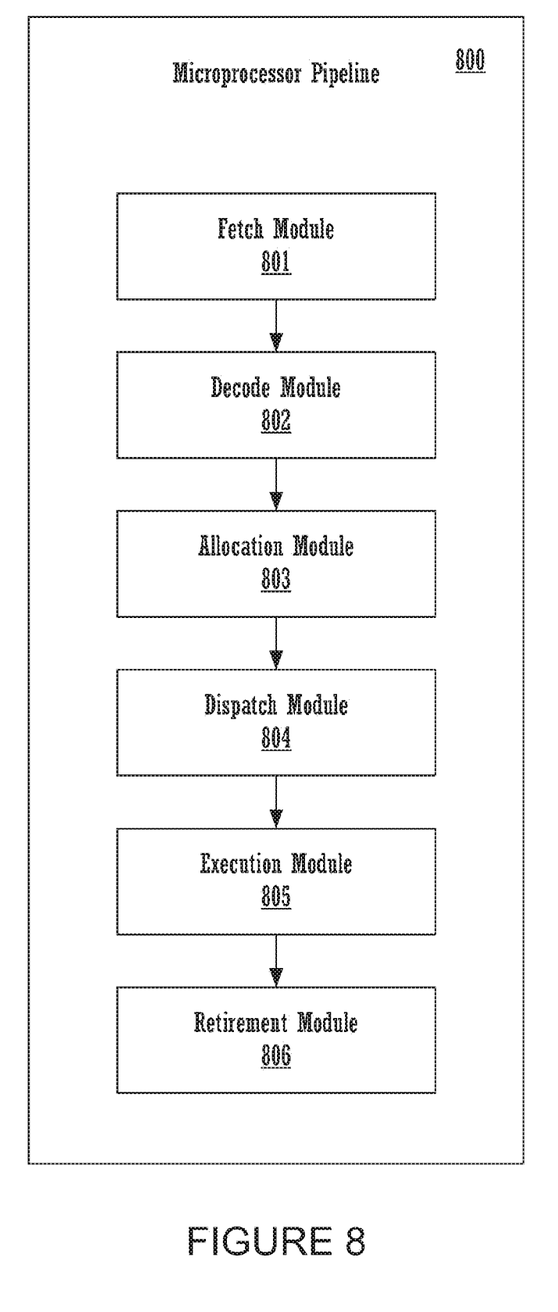
FIG. 8 shows a diagram of an exemplary microprocessor pipeline in accordance with one embodiment of the present invention.

FIG. 8 shows a diagram of an exemplary microprocessor pipeline 800 in accordance with one embodiment of the present invention. The microprocessor pipeline 800 includes a fetch module 801 that implements the functionality of the process for identifying and extracting the instructions comprising an execution, as described above. In the FIG. 8 embodiment, the fetch module is followed by a decode module 802, an allocation module 803, a dispatch module 804, an execution module 805 and a retirement modules 806. It should be noted that the microprocessor pipeline 800 is just one example of the pipeline that implements the functionality of embodiments of the present invention described above. One skilled in the art would recognize that other microprocessor pipelines can be implemented that include the functionality of the decode module described above.

The foregoing description, for the purpose of explanation, has been described with reference to specific embodiments. However, the illustrated discussions above are not intended to be exhaustive or to limit the invention to the precise forms disclosed. Many modifications and variations are possible in view of the above teachings. Embodiments were chosen and described in order to best explain the principles of the invention and its practical applications, to thereby enable others skilled in the art to best utilize the invention and various embodiments with various modifications as may be suited to the particular use contemplated.

What is claimed is:

1. A method for determining reliably predicted instruction sequences for branch instructions, the method comprising:
    determining a plurality of instruction sequences, wherein each instruction sequence in the plurality of instruction sequences has been fetched at least a first threshold number of times;
    determining a branch instruction sequence from the plurality of instruction sequences that includes a plurality of branch instructions and has been correctly predicted to follow the plurality of branch instructions at least a second threshold number of times;
    storing the branch instruction sequence in a buffer;
    decoding a first branch instruction, wherein the first branch instruction is the first sequential instruction in the plurality of branch instructions; and
    retrieving the branch instruction sequence from the buffer for execution in response to decoding the first branch instruction.

2. The method of claim 1, further comprising:
    executing the branch instruction sequence, including the plurality of branch instructions, in response to retrieving the branch instruction sequence from the buffer.

3. The method of claim 1, wherein the branch instruction sequence is stored at a location in the buffer using the first branch instruction as an index value for the location within the buffer.

4. The method of claim 3, wherein a second branch instruction of the plurality of branch instructions is used as a tag for the location within the buffer.

5. The method of claim 3, wherein a hash of an address of the first branch instruction is used as the index value for the location within the buffer.

6. The method of claim 1, further comprising:
    determining that the branch instruction sequence has mis-predicted at least a third threshold number of times; and
    evicting the branch instruction sequence from the buffer in response to determining that the branch instruction sequence has mis-predicted at least the third threshold number of times.

7. The method of claim 1, wherein the plurality of instructions sequences are one of native instructions of an architecture of a microprocessor and microcode.

8. A processor for determining reliably predicted instruction sequences for branch instructions, the processor comprising:
    a fetch module that fetches a plurality of instructions;
    a buffer that stores instruction sequences;
    a sequence predictor operable to monitor execution of instructions to determine a plurality of instruction sequences, wherein each instruction sequence in the plurality of instruction sequences has been fetched at least a first threshold number of times;
    a counter operable to determine a branch instruction sequence from the plurality of instruction sequences that includes a plurality of branch instructions and has been correctly predicted to follow the plurality of branch instructions at least a second threshold number of times, wherein the fetch module stores the branch instruction sequence in the buffer; and
    a decoder to decode a first branch instruction, wherein the first branch instruction is the first sequential instruction in the plurality of branch instructions,
    wherein the fetch module fetches the branch instruction sequence from the buffer for execution in response to decoding the first branch instruction.

9. The processor of claim 8, further comprising:
    an execution module to execute the branch instruction sequence, including the plurality of branch instructions, in response to fetching the branch instruction sequence from the buffer.

10. The processor of claim 8, wherein the branch instruction sequence is stored at a location in the buffer using the first branch instruction as an index value for the location within the buffer.

11. The processor of claim 10, wherein a second branch instruction of the plurality of branch instructions is used as a tag for the location within the buffer.

12. The processor of claim 10, wherein a hash of an address of the first branch instruction is used as the index value for the location within the buffer.

13. The processor of claim 8, wherein the plurality of instructions sequences are one of native instructions of an architecture of the processor and microcode.

14. A non-transitory machine-readable medium that stores instructions, which when executed by a processor cause the processor to:
   determine a plurality of instruction sequences, wherein each instruction sequence in the plurality of instruction sequences has been fetched at least a first threshold number of times;
   determine a branch instruction sequence from the plurality of instruction sequences that includes a plurality of branch instructions and has been correctly predicted to follow the plurality of branch instructions at least a second threshold number of times;
   store the branch instruction sequence in a buffer;
   decode a first branch instruction, wherein the first branch instruction is the first sequential instruction in the plurality of branch instructions; and
   retrieve the branch instruction sequence from the buffer for execution in response to decoding the first branch instruction.

15. The non-transitory machine-readable medium of claim 14, wherein the instructions further cause to the processor to:
   execute the branch instruction sequence, including the plurality of branch instructions, in response to retrieving the branch instruction sequence from the buffer.

16. The non-transitory machine-readable medium of claim 14, wherein the branch instruction sequence is stored at a location in the buffer using the first branch instruction as an index value for the location within the buffer.

17. The non-transitory machine-readable medium of claim 16, wherein a second branch instruction of the plurality of branch instructions is used as a tag for the location within the buffer.

18. The non-transitory machine-readable medium of claim 16, wherein a hash of an address of the first branch instruction is used as the index value for the location within the buffer.

19. The non-transitory machine-readable medium of claim 14, further comprising:
   determining that the branch instruction sequence has mis-predicted at least a third threshold number of times; and
   evicting the branch instruction sequence from the buffer in response to determining that the branch instruction sequence has mis-predicted at least the third threshold number of times.

20. The non-transitory machine-readable medium of claim 14, wherein the plurality of instructions sequences are one of native instructions of an architecture of the processor and microcode.

* * * * *